F. GEBHARDT.
CAR TRUCK.
APPLICATION FILED MAY 28, 1908.
927,962.
Patented July 13, 1909.
3 SHEETS—SHEET 2.
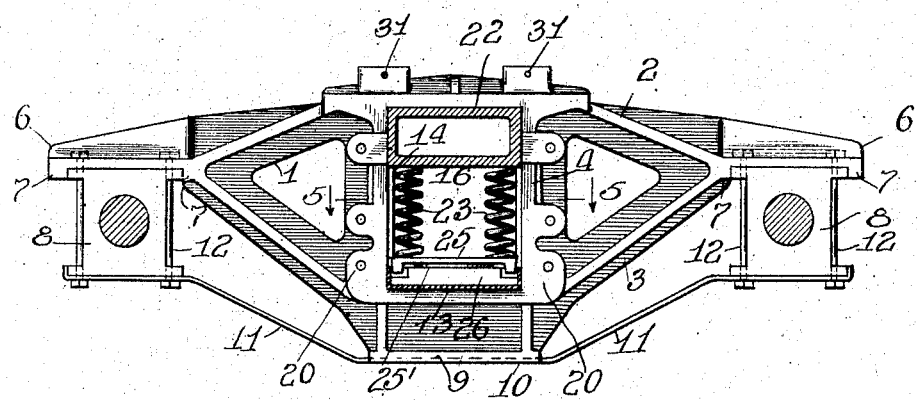
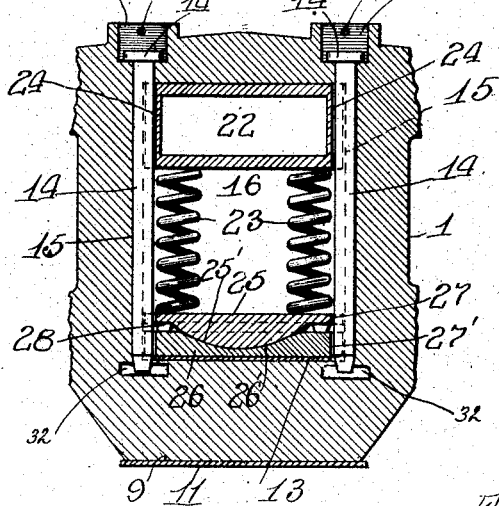
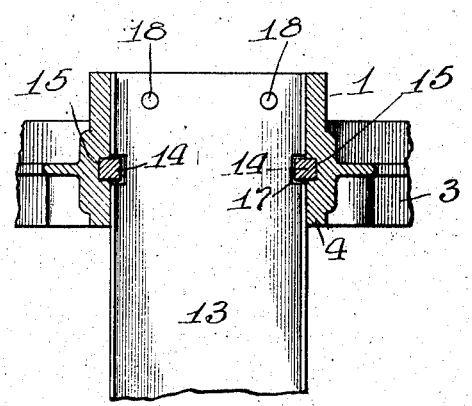
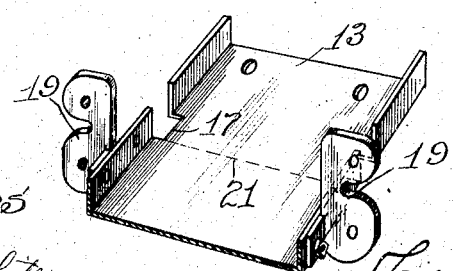
Witnesses
Harry R. L. White
M. A. Kiddie
Inventor
Fredrich Gebhardt
By Wm. T. Belt Atty.

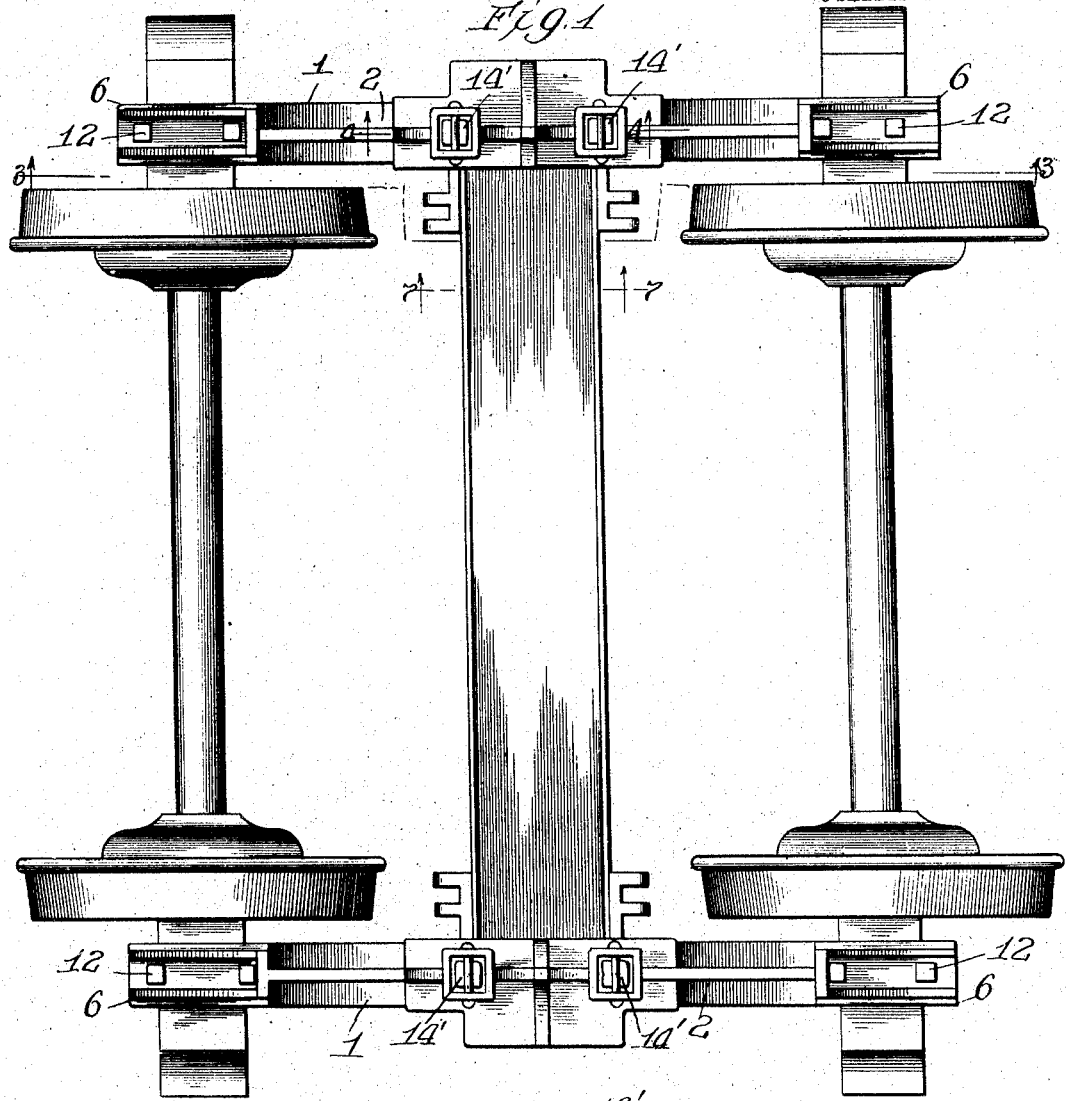

F. GEBHARDT.
CAR TRUCK.
APPLICATION FILED MAY 28, 1908.
927,962.
Patented July 13, 1909.
3 SHEETS—SHEET 3.
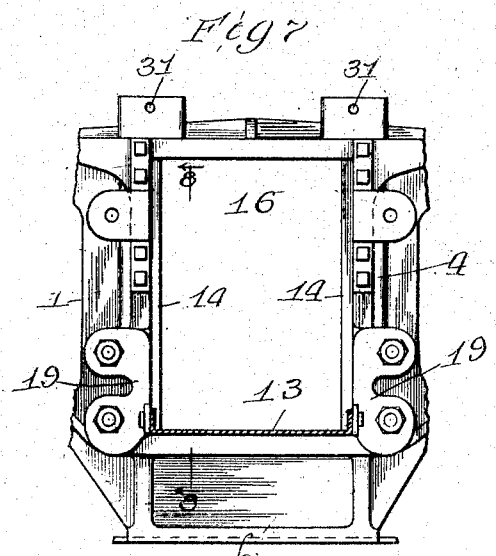
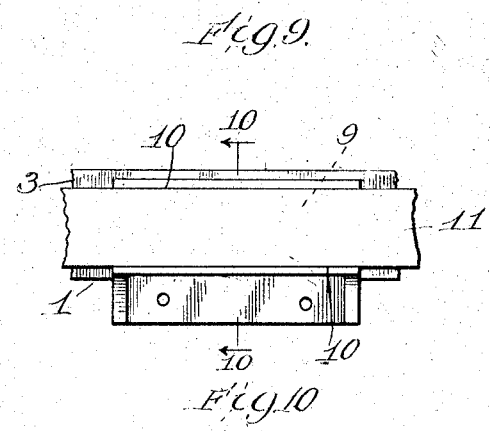
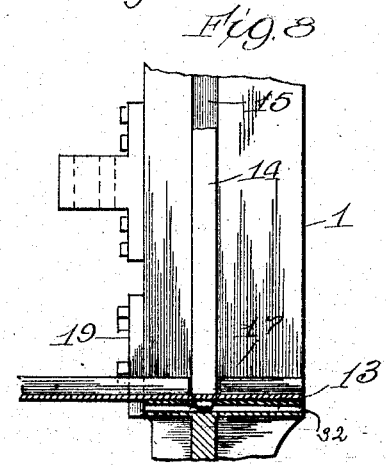
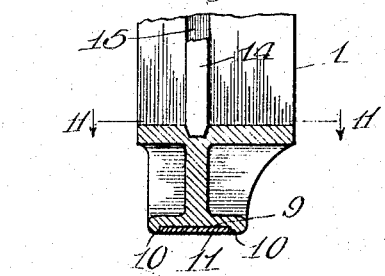
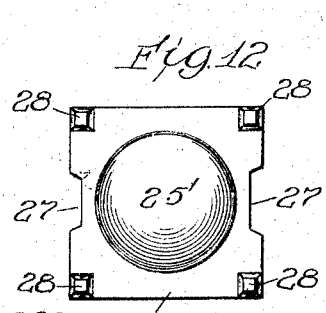
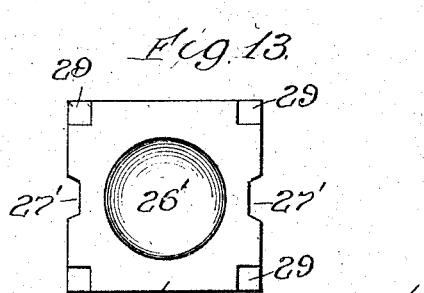
Witnesses
Harry R. White
M. A. Kiddie
Inventor
Fredrich Gebhardt
By _____ Atty

UNITED STATES PATENT OFFICE.

FREDRICH GEBHARDT, OF ALLIANCE, OHIO, ASSIGNOR OF ONE-HALF TO GEORGE A. WOODMAN, OF CHICAGO, ILLINOIS.

CAR-TRUCK.

No. 927,962.

Specification of Letters Patent.

Patented July 13, 1909.

Application filed May 28, 1908. Serial No. 435,427.

*To all whom it may concern:*

Be it known that I, FREDRICH GEBHARDT, a citizen of the United States, residing at Alliance, in the county of Stark and State of Ohio, have invented new and useful Improvements in Car-Trucks, of which the following is a specification.

This invention relates to improvements in car trucks and its object is to construct the truck of comparatively few parts and to connect the parts in a simple manner so that they may be readily assembled and taken apart.

Another object of the invention is to provide for a lateral adjustment of the truck bolster relative to the truck frame to relieve the truck to a very large extent from the usual strains in service and thereby decrease the friction and wear on the rails and on the flanges of the wheels. And a further object of the invention is to construct the truck so that the bolster may be easily and quickly removed through either side frame.

In the accompanying drawings Figure 1 is a top plan view of a truck embodying my invention without the bolster. Fig. 2 is a detail view of one of the removable guides for the channel plate connecting the side frames to the truck. Fig. 3 is a sectional view on the line 3—3— of Fig. 1, and showing one of the side frames of the truck in elevation. Fig. 4 is an enlarged sectional view on the line 4—4 of Fig. 1. Fig. 5 is an enlarged sectional view on the line 5—5 of Fig. 3. Fig. 6 is a detail perspective view of one end of the channel connecting plate. Fig. 7 is a sectional view on the line 7—7— of Fig. 1, the bolster and some of the other parts being omitted. Fig. 8 is a sectional view on the line 8—8 of Fig. 7. Fig. 9 is a detail bottom plan view of a portion of one side frame and showing the tie strap. Fig. 10 is a sectional view on the line 10—10 of Fig. 9. Fig. 11 is a sectional view on the line 11—11 of Fig. 10.
Figs. 12 and 13 are plan views of the bearing plates.

Referring to the drawings, the side frames 1 of the truck are made alike and each comprises a single casting having the upper arch 2, the lower arch 3 and the truck columns 4 (Fig. 3). Each side frame is provided at its ends with projections 6 having guide lugs 7 on the underside thereof to receive the journal boxes 8. At the bottom of the side frame, between its ends, there is a seat 9 formed between two guides 10 (Fig. 9) for the tie strap 11. The journal boxes are secured in place by bolts 12 which extend through the tie strap, at the ends thereof, and through the projections 6 of the side frame.

The guide grooves extend downward below the lower wall of the opening 16 to receive the lower ends of the guide bolts and so that the guide bolts will be securely held at their lower ends as well as at their upper ends in an upright position. I prefer also to provide the side frame with a lateral opening 32 extending from the lower end of the guide groove to the front or side of the frame so that a tool or instrument of any suitable kind may be inserted therein and forced beneath the guide bolt to loosen it in event that it becomes rusty or stuck and facilitate its removal. The lower end of the guide bolt may be beveled or otherwise shaped and fitted to permit a chisel or other tool or instrument to be driven thereunder.

The side frames are connected by a removable channel plate 13 (Fig. 6) and this channel plate is secured to the side frames by removable guides 14 (Fig. 2) which may be made in the form of bolts and are partly seated in guide grooves 15 in the truck columns. The guides 14 project into the opening 16 between the truck columns and the channel plate 13 is provided with recesses 17 to receive said guides. In addition to this means for securing the channel plate to the side frames I may fasten the plate to the frame by bolts 18 (Fig. 5) and I may also provide the channel plate with ears 19 (Fig. 6) and bolt them to lugs 20 on the side frame (Fig. 7). Either the bolts 18 or the ears 19 or both may be used, or they may be omitted entirely, as desired. Or the channel plate may terminate at the dotted line 21, at each end thereof, (Fig. 6), in which case the plate would be secured to the side frames by bolts passing through the ears 19.

I may use any suitable bolster in my improved truck and in the drawings I have shown a cast bolster 22 (Fig. 3) which is arranged between the truck columns and supported on the springs 23. The bolster is provided with recesses 24 (Fig. 4) to receive the removable guides 14. The springs 23 are mounted on a bearing fitting between the truck columns and resting upon the connecting plate 13. This bearing consists of an upper member 25 and a lower member 26. The upper member (Fig. 12) has a convex surface 25' and the lower member (Fig. 13) has a concave surface 26' to receive the convex surface on the upper member. Both members are notched at 27, 27' to receive the removable guides 14. The upper member 25 is provided at its corners with studs 28 and the lower member 26 is provided at its corners with recesses 29 to receive the studs on the upper member. The notches 27 in the upper member are longer than the notches 27' in the lower member and the recesses 29 in the lower member are somewhat larger than the studs 28 on the upper member, so that the upper member, on which the springs 23 rest, may move rotatively and universally on the lower member. The concavo-convex bearing provides a firm support for the springs and also an adjustable support whereby the bolster, which rests on the springs, may adjust itself to relieve strains on the truck. The movement of the upper member on the lower member is limited by the studs 28 engaging the recesses 29 and also by the end walls of the slots 27 engaging the removable guides 14. Whenever the truck binds on the track for any reason the bolster will adjust itself automatically and release the strain thereby decreasing the friction and wear on the rails and the flanges of the wheels. This manner of supporting the bolster at its ends may be used in connection with truck frames of other description with equally satisfactory results.

The guides 14 are loosely inserted in place in the side frames and are provided with heads 14' which are preferably located in recesses 30 in the side frames (Fig. 4). These guides may be kept from working up by any suitable means such as the transverse pins 31 passing through the walls of the recesses 30. The guides 14 may be made of any desired transverse shape and diameter and the grooves 15 in the truck columns and also the recesses in the connecting plate 13; the spring bearing and the bolster are made of a shape and size to accommodate these guides.

My improved truck is composed of a comparatively few parts, the side frames each consisting in its principal part of a steel casting. The parts are so arranged and connected that they can be readily and quickly assembled or taken apart. The tie strap is held between the guides 9 on the frame and is secured at its ends only to the frame by the same bolts which secure the journal boxes in place. The journal boxes can be easily removed from the frame by loosening or detaching these bolts. The side frames are held together by the connecting plate which may be secured to the frames by the guides or by the guides and the bolts as heretofore described. If by the guides only, the plate can be easily disconnected from the frames by removing the guides; if the bolts are used they must, of course, be removed also. These removable guides constitute a very simple and effective means for securing the connecting plate, the spring bearings and the bolster in the side frames of the truck. The truck hanger brackets 33 may be cast integral with the side frames or they may be bolted thereto as desired.

What I claim and desire to secure by Letters Patent is:

1. The combination of the side frame of a car truck, said side frame having an opening therein and vertical grooves in the side walls of said opening, a truck bolster having its end arranged in said opening and provided with recesses in its sides to register with said grooves, and removable devices arranged in said grooves and recesses and held at top and bottom independently of their engagement of the bolster to maintain them in upright position.

2. The combination of the side frame of a car truck, said side frame having an opening therein and vertical grooves in the side walls of said opening extending above and below said opening, a truck bolster having its end arranged in said opening and provided with recesses in its sides to register with said grooves, and removable guide bolts seated in said grooves and recesses and held at top and bottom to maintain them in upright position.

3. The combination of the side frame of a car truck, said side frame having an opening therein and vertical grooves in the side walls of said opening extending above and below said opening, a truck bolster having its end arranged in said opening and provided with recesses in its sides to register with said grooves, and removable guide bolts seated in said grooves and recesses and held at top and bottom to maintain them in upright position, said side frame having lateral openings extending to the lower end of said guide grooves to permit access to the lower end of the guide bolts.

4. A car truck comprising a pair of side frames, a connecting plate having notches therein, and guides on the side frames engaging said notches to secure the plate and side frames together.

5. A car truck comprising a pair of side frames, a connecting plate having notches therein, and removable guide bolts on the side frames engaging said notches to secure the plate and side frames together.

6. A car truck comprising a pair of side frames, each frame having a pair of columns, and a vertical groove in one of said columns, a removable guide bolt seated partly in said groove and projecting partly into the opening between the columns, and a connecting plate extending between said columns and having a notch to receive said guide bolt.

7. A car truck comprising a pair of side frames, each frame having a pair of columns and a vertical groove in each of said columns, a removable guide bolt seated partly in each groove and projecting partly into the opening between the columns, and a connecting plate extending between said columns and having notches in its side edges to receive said guide bolts.

8. A car truck comprising a pair of side frames, each side frame having a pair of columns and a vertical groove in one of said columns and a recess at the upper end of said groove, a removable headed guide bolt seated partly in said groove and projecting partly into the opening between the columns, the head of said bolt being seated in said recess, means for holding the bolt in place, and a connecting plate extending between said columns and having a notch to receive said guide bolt.

9. A car truck comprising a pair of side frames, each side frame having a pair of columns and a vertical groove in each of said columns and a recess at the upper end of each groove, a removable headed guide bolt seated partly in each of said grooves and projecting partly into the opening between the columns, the heads of said bolts being seated in said recesses, cross pins extending through the walls of said recesses above the bolts to hold the bolts in their grooves, and a connecting plate extending between said columns and having notches in its side edges to receive said guide bolts.

10. The combination of the side frame of a car truck, said side frame having a pair of columns and an opening therebetween to receive the end of the truck bolster, a spring in said opening beneath the bolster, and a bearing on the frame for the spring and comprising a fixed lower member and a relatively universally movable upper member.

11. The combination of the side frame of a car truck having an opening therein, a spring in said opening to support one end of the truck bolster, and a bearing beneath said spring, said bearing being constructed to permit a limited rotative movement of the spring and bolster relative to said frame.

12. The combination of the side frame of a car truck having an opening therein to receive the end of the truck bolster, a spring in said opening beneath the bolster, and a bearing beneath the spring and comprising a fixed lower member and a rotatively movable upper member.

13. The combination of the side frame of a car truck having an opening therein to receive the end of the truck bolster, a spring in said opening beneath the bolster, and a bearing beneath the spring and comprising a fixed lower member and a relatively universally movable upper member, said members having circular concavo-convex bearing surfaces.

14. The combination of the side frame of a car truck having an opening therein to receive the end of the truck bolster, a spring in said opening beneath the bolster, and a bearing beneath the spring and comprising a fixed lower member having a concave bearing surface and a relatively universally movable upper member having a convex bearing surface.

15. The combination of the side frame of a car truck having an opening therein to receive the end of the truck bolster, a spring in said opening beneath the bolster, and a bearing beneath the spring and comprising a fixed lower member and a relatively universally movable upper member, and means for limiting the movement of said upper member.

16. The combination of the side frame of a car truck having an opening therein to receive the end of the truck bolster, a spring in said opening beneath the bolster, and a bearing beneath the spring and comprising a fixed lower member and a relatively movable upper member, and interengaging studs and recesses on said members to limit the movement of said upper member.

17. The combination of the side frame of a car truck having an opening therein to receive the end of the truck bolster, a spring in said opening beneath the bolster, and a bearing beneath the spring and comprising a fixed lower member and a relatively movable upper member, one of said members having studs at its corners and the other member having recesses at its corners to receive said studs said recesses being larger than the studs to permit the movement of said upper member.

18. The combination of the side frame of a car truck having an opening therein to receive the end of the truck bolster, a spring in said opening beneath the bolster, and a bearing beneath the spring and comprising a fixed lower member having a concave bearing surface and a relatively movable upper member having a convex bearing surface, studs on one of said members, at the corners thereof, and recesses at the corners of the other member to receive said studs said recesses being larger than said studs to permit the movement of said upper member.

19. The combination of the side frame of a car truck having an opening therein to receive the end of the truck bolster, a spring in said opening beneath the bolster, and a bearing beneath the spring and comprising a fixed lower member and a relatively movable upper member, said members having notches in their side edges, and means on the frame for engaging said notches to secure said bearing in place.

20. The combination of the side frame of a car truck having an opening therein to receive the end of the truck bolster, a spring in said opening beneath the bolster, and a bearing beneath the spring and comprising a fixed lower member and a relatively movable upper member, said members having notches in their side edges, and guide bolts on the frame to engage said notches and secure said bearing in place.

21. The combination of the side frame of a car truck having an opening therein to receive the end of the truck bolster, a spring in said opening beneath the bolster, and a bearing beneath the spring and comprising a fixed lower member and a rotatively movable upper member, said members having notches in their side edges, the notches in the upper member being wider than the notches in the lower member, and means on the frame to engage said notches and secure the bearing in place.

22. A car truck comprising a pair of side frames, each frame having a pair of columns and an opening therebetween and a vertical groove in each column, guide bolts seated partly in said grooves and projecting partly into the opening between the columns, a connecting plate extending between said columns and having notches in its side edges to receive said guide bolts, a spring bearing in said opening and having notches in its side edges to receive said guide bolts, a spring on said bearing, and a truck bolster extending into said opening above the spring and having notches in its side edges to receive said guide bolts.

23. A car truck comprising a pair of side frames, each frame having a pair of columns and an opening therebetween and a vertical groove in each column, guide bolts seated partly in said grooves and projecting partly into the opening between the columns, a connecting plate extending into said opening and having notches in its side edges to receive said guide bolts, ears on said plate, and bolts passing through said ears into the side frame.

24. The combination of the side frame of a car truck, said side frame having an opening therein and vertical grooves in the side walls of said opening, a truck bolster having its ends arranged in said opening and provided with recesses in its sides to register with said grooves, a spring in said opening to support one end of the truck bolster, a bearing beneath said spring and having notches to register with said grooves, and removable guide bolts seated in said grooves and recesses and notches.

25. The combination of the side frame of a car truck, said side frame having an opening therein and vertical grooves in the side walls of said opening extending above and below said opening, a truck bolster having its ends arranged in said opening and provided with recesses in its sides to register with said grooves, a spring in said opening to support one end of the truck bolster, a bearing beneath said spring comprising two parts, one of which is movable relatively to the other and both of which have notches to register with said grooves, and removable guide bolts seated in said grooves and recesses and notches.

26. The combination of the side frame of a car truck, said side frame having an opening therein and vertical grooves in the side walls of said opening extending above and below said opening, a truck bolster having its ends arranged in said opening and provided with recesses in its sides to register with said grooves, a spring in said opening to support one end of the truck bolster, a bearing beneath said spring and comprising a relatively fixed part and a relatively universally movable part, both of said parts having notches to register with said grooves, and removable guide bolts seated in said grooves and recesses and notches.

27. The combination of the side frame of a car truck having an opening therein, a spring in said opening to support one end of the truck bolster, and a bearing beneath said spring comprising two members, one of which is capable of rotative and universal rocking movements relative to the other.

FREDRICH GEBHARDT.

Witnesses:
WILLIAM L. HART,
F. L. MOWRY.